June 23, 1953 A. PFENNINGER, JR 2,643,320

HEATING ELEMENT

Filed April 19, 1950

Inventor
Arnold Pfenninger Jr.
By Rockwell & Bartholow
Attorneys

Patented June 23, 1953

2,643,320

UNITED STATES PATENT OFFICE 2,643,320

HEATING ELEMENT

Arnold Pfenninger, Jr., Hamden, Conn., assignor to The Connecticut Hard Rubber Company, New Haven, Conn., a corporation of Connecticut Application April 19, 1950, Serial No. 156,849

4 Claims. (Cl. 219—19)

This invention relates to electric heating devices and more particularly to a heating element which can be made extremely thin and at the same time will possess the desired characteristics of being resistant to temperature at wide ranges, of having suitable dielectric or insulating properties, and of being water repellent so as to be resistant to weather.

In certain instances need has arisen for a heating element which is electrically energized but which may be made of minimum thickness, for example of a thickness of .045 of an inch, more or less, and which has an outer coating such that it will not crack or disintegrate at either high or low temperatures, which will be water resistant or repellent, so that it will not be adversely affected by being subject to weather, and in which the heating element will be suitably insulated so that a protection will be provided against a difference in potential of 5,000 volts between the outer surface of the element and the wire which carries the current.

In the present invention such characteristics are provided by a construction which employs woven glass cloth or fiber glass, suitably impregnated or covered when necessary, both as a base member for the wire of the heating element and for the exterior covering to provide for insulation and resistance to temperature and moisture.

As illustrated, the device is in the form of a very thin flat pad or sheet of the general shape of a trapezoid in outline with a central opening, although it will be understood that the geometrical shape of the device may be varied as desired without departing from the inventive concept.

One use for such a heating element is in connection with de-icing of airplanes, but it is understood that the invention is not necessarily limited to this particular application. In using a heating element upon the surface of airplanes, it is desirable that it have the advantageous characteristics referred to above and also be of such construction that it may be manufactured at relatively low cost.

One object of the present invention is to provide a new and improved heating element which may be employed in sheets where it will be exposed to relatively great changes in temperature.

A further object of the invention is the provision of an electrical heating element of the character described in which the current-carrying element will be well insulated from the exterior surface.

Still another object of the invention is to provide an electrical heating element which will be of minimum thickness, resistant to water and changes of temperature, and in which the current-carrying element will be covered in such a manner that it will be well insulated.

To these and other ends the invention consists in the novel features and combinations of parts to be hereinafter described and claimed.

As illustrated, the heating device comprises a member designated generally by the numeral 10 consisting of a thin plate or pad of substantially the form of a trapezoid and having a central opening 11. It may be made of any desired dimensions so far as length and width is concerned, but would preferably be quite thin, and in this instance is approximately 0.45 of an inch in thickness.

Figure 2:
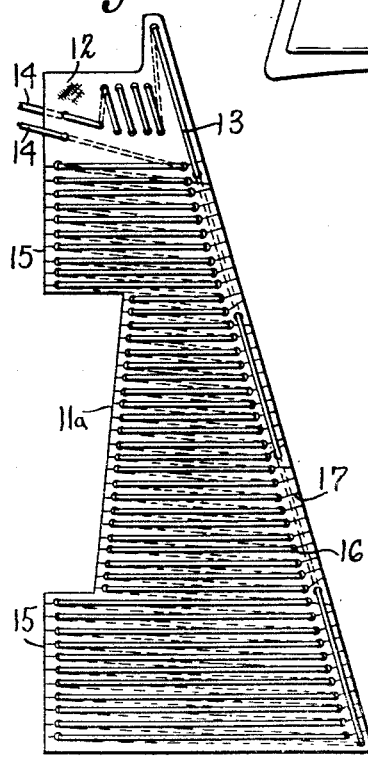
Fig. 2 is a plan view of one of the central heating elements comprising the current-carrying wire and the base member or card upon which it is wound.

It consists of a central core, shown in Fig. 2, comprising a base member or card 12 upon which is wound a flat current-carrying resistance wire or ribbon 13 of any suitable metal or metal alloy such, for example, as Nichrome wire. The base member 12 is constructed of a heat resisting material which, in this instance, comprises a plurality of sheets of woven glass or fiber glass cloth. As shown three or four of such sheets are laminated with a thermosetting sheeting of silicone resin, thus giving the member 12 a degree of stiffness and rigidity so that it will be in the form of a thin sheet or card having resistance to temperatures as high as 400° Fahrenheit.

In preparation of the member 12, the fiber glass cloth is cut into pieces of the desired size and the layers of this material are plied upon a glass plate of dimensions slightly greater than the pieces of cloth. The silicone resin is applied to this cloth by a brush or spray application in sufficient quantity to provide a slight excess on the surface. The laminate is then removed from the plate and air dried to permit the solvent in the resin to evaporate. The laminated sheets are then trimmed and placed on a hot plate of a temperature of about 350° F. where they are flattened out by being stroked outwardly from the center.

After being cooled, this card material is stacked between layers of fiber glass cloth in piles of twenty layers of cloth and put into a forced circulation oven at about 525° F. for approximately two hours to cure the resin. The card material then becomes a stiff laminate suitable for holding the resistance ribbon. The cards are then separated from the fiber glass layers and die cut to the desired shape, after which the openings for the resistance wire 13 are drilled.

The resistance wire 13 is laced or wound through the drilled openings 16 in this member so that it lays upon both sides thereof in substantially parallel courses. The two ends 14 of the wire are left free at the upper portion of this unit so that they may be brought out through the insulated covering to be applied as hereinafter described, and connected with a source of current.

Figure 1:
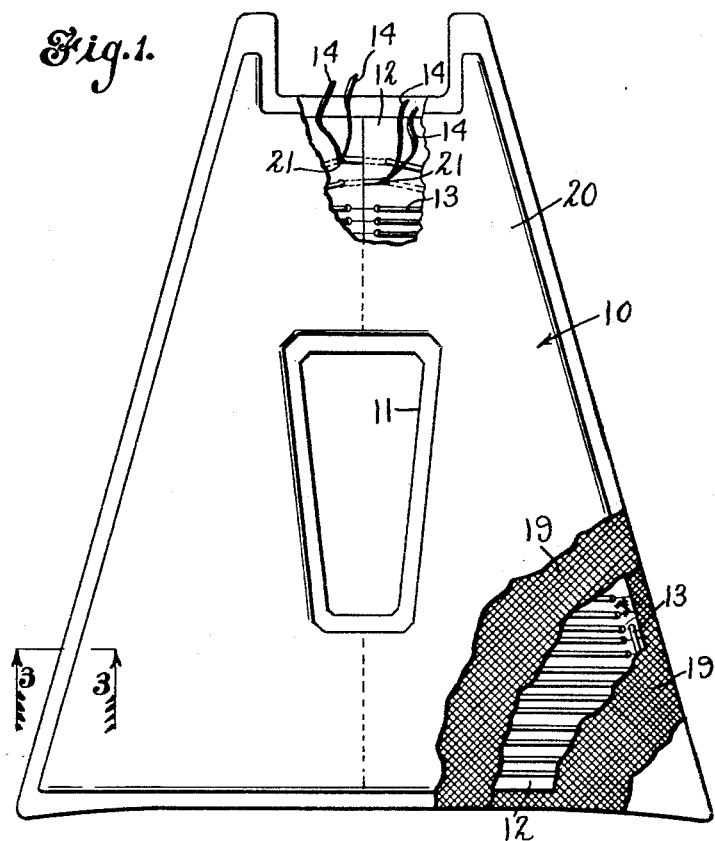
Fig. 1 is a top plan view of an electric heating device embodying my invention, some parts being broken away to show the interior structure.

It will be understood that each of the members 12 is of the shape shown in Fig. 2, each being substantially one half of a trapezoid, and two of these members are used in each of the heating devices 10, the members being laid into the unit with the edges 15 of one member abutting the corresponding edges of the other member so that the cut-out portions 11a, shown in Fig. 2, form the opening 11 in the completed device shown in Fig. 1. Besides being heat resistant, the base member 12 will thus be of insulating material and the various courses of the wire 13 will be held spaced apart by being threaded through the openings as shown. The edges of the card are cut through to these openings as shown at 17 so as to permit the entry of the wire into the openings through the edge slits.

Figure 3:
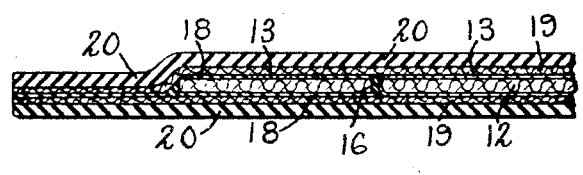
Fig. 3 is a greatly enlarged sectional view on line 3—3 of Fig. 1.

Upon each side or face of the central core member thus far described is spread a coating of silicone rubber bonding cement, this coating being designated by the numeral 18 in Fig. 3, so that the outer layers to be hereinafter described may be secured in place by this cement which lies between the windings of wire 13.

Over each of these layers of the silicone rubber cement is disposed a layer of untreated woven glass or fiber glass cloth 19, this cloth being thus cemented to the member 12 over the wires 13, which latter will now be held firmly in place.

The layers 19 of the untreated glass cloth may be single layers or a plurality of plies if desired. Normally the same number of layers will be used upon one side as is used upon the other side of the central core.

Upon the outside of each of the layers of fiber glass cloth 19 is then bonded a layer of woven glass or fiber glass cloth (which may consist of one or more plies) coated with silicone rubber which has been previously cured, this layer forming the outer covering of the unit and being designated by the numeral 20. This outer covering provides a water resistant quality to the unit and at the same time it is resistant to both high and low temperatures, and particularly the rubber will not crack or break up at low temperatures under the vibration to which the device may be subjected in use. Also the outer cover provides insulation for the current-carrying element 13 such that it will provide protection against a difference in potential of approximately 5,000 volts between the outer surface and the wire element. The two untreated layers of glass cloth 19 are particularly desirable for their cushioning effect as well as insulation, as in use the elements are subjected to intensive vibration, and it is desirable to cushion the central core.

The outer sheath comprising the layers 19 and 20 may be prepared by first coating a layer of fiber glass cloth with the silicone rubber to form the covering 20. After this has been tested for dielectric properties, blanks of the proper size are cut from the material, a thin layer of silicone adhesive is spread on one side of the blank, a layer of woven glass cloth (the layer 19) is pressed down on the cement, and another layer of the adhesive is placed on this cloth. The sheath material is then air dried to remove the solvent and is given a further dielectric test.

One such sheath is placed on each side of the wound card with the cemented sides disposed inwardly, and the assembly is molded in a regular molding press to be molded and cured.

The ends of the wires 13 of each of the sections of the core 12 are brought through the outer layer 20 as shown at 21 (Fig. 1) so that they may be connected with a source of current.

While I have shown and described a preferred embodiment of my invention, it will be understood that it is not to be limited to all of the details shown, but is capable of modification and variation within the spirit of the invention and within the scope of the claims.

What I claim is:

1. An electrical heat unit comprising a flat relatively stiff centrally disposed element having a resistance wire secured upon each surface thereof, said element comprising a plurality of sheets of woven glass cloth bonded together, a covering sheath applied to each side of said central element, each of said sheaths comprising one or more layers of woven glass cloth having an outer coating of silicone rubber to provide insulation and resistance to weather, and a cushioning sheet of untreated woven glass cloth between each outer cover and the central element.

2. An electrical heat unit comprising a flat relatively stiff centrally disposed element having a resistance wire secured upon each surface thereof, said element comprising a plurality of sheets of woven glass cloth bonded together by a thermoset silicone resin, a covering sheath applied to each side of said central element, each of said sheaths comprising one or more layers of woven glass cloth having an outer coating of silicone rubber to provide insulation and resistance to weather, and a cushioning sheet of untreated woven glass cloth between each outer cover and the central element, said cushioning sheet being cemented to the central element to hold the wire in place and said outer sheath being cemented to the cushioning sheet.

3. An electrical heat unit consisting essentially of only glass cloth, resistance wire and macromolecular silicone structural material reinforced by glass fibers, the resistance wire being mounted on a thin card attached to the face of and suspended by at least one cushioning sheet of untreated glass fabric, the opposite face of the untreated cushioning sheet being secured to a sheathing having an outer surface of silicone rubber.

4. An electrical heat unit as in claim 3 in which the resistance wire is positioned in narrow channels defined by the spaced adhesions between the flat card and the untreated cushioning sheet of glass cloth, said untreated cloth also being adhered to the interior of a sheathing of silicone rubber whereby the unit is characterized by an extreme resistance to vibration under severe subfreezing weather conditions, by the ability to withstand temperatures of about 300° F., by a water resistance permitting use of the unit for de-icing, by the ability to withstand potentials in excess of 3,000 volts between the resistance wire and the exterior of the sheath, and by a thickness not in excess of 0.05 inch.

ARNOLD PFENNINGER, JR.

References Cited in the file of this patent

UNITED STATES PATENTS

| Number | Name | Date |
|---|---|---|
| 1,632,651 | Hubbard | June 14, 1927 |
| 2,251,697 | Van Daam et al. | Aug. 5, 1941 |
| 2,397,568 | Seaman | Apr. 2, 1946 |
| 2,406,367 | Griffith et al. | Aug. 27, 1946 |
| 2,496,279 | Ely et al. | Feb. 7, 1950 |
| 2,497,998 | Lee | Feb. 21, 1950 |
| 2,503,457 | Opeir et al. | Apr. 11, 1950 |
| 2,540,472 | Boyd et al. | Feb. 6, 1951 |

FOREIGN PATENTS

| Number | Country | Date |
|---|---|---|
| 614,587 | Great Britain | Dec. 17, 1948 |

OTHER REFERENCES

Knight: "The Silicones—Truly New Materials," Materials and Methods, October 1945, pp. 1069–1073.